United States Patent [19]
Dong et al.

[11] Patent Number: 6,009,222
[45] Date of Patent: Dec. 28, 1999

[54] OPTICAL FIBRE AND OPTICAL FIBRE GRATING

[76] Inventors: Liang Dong, 6 Randalls Crescent, Leatherhead, Surrey KT22 7NP; David Neil Payne, 13 Sylan Lane, Hamble, Southampton, Hampshire SO3 5QB; Laurence Reekie, Pinewood, Norris Hill, Bitterne Park, Southampton, Hampshire SO2 4JH, all of United Kingdom

[21] Appl. No.: 08/928,347

[22] Filed: Sep. 12, 1997

[51] Int. Cl.[6] .................................................. G02B 6/02
[52] U.S. Cl. ........................... 385/127; 385/142; 385/144
[58] Field of Search .................................. 385/123–128, 385/141–145, 37

[56] References Cited

U.S. PATENT DOCUMENTS

| | | | |
|---|---|---|---|
| 4,372,647 | 2/1983 | Okamoto et al. | 385/127 |
| 4,691,990 | 9/1987 | Cohen et al. | 385/127 |
| 4,975,102 | 12/1990 | Edahiro et al. | 65/3.12 |
| 5,732,170 | 3/1998 | Okuda et al. | 385/27 |
| 5,740,297 | 4/1998 | Onishi et al. | 385/127 |
| 5,852,690 | 12/1998 | Haggans et al. | 385/37 |
| 5,881,197 | 3/1999 | Dong et al. | 385/127 |

OTHER PUBLICATIONS

Dong et al, Optical Fibers with Depressed Claddings for Suppression of Coupling into Cladding Modes in Fiber Bragg Gratings, IEEE Photonics Technology Letters, V 9, No. 1, pp. 64–66, Jan. 1997.

*Primary Examiner*—John D. Lee
*Assistant Examiner*—Juliana K. Kang

[57] ABSTRACT

An optical fiber comprises a glass core having a core refractive index; a glass primary cladding at least partially surrounding said core, said primary cladding having a primary cladding refractive index lower than said core refractive index; a glass secondary cladding at least partially surrounding said primary cladding, said secondary cladding having a secondary cladding refractive index lower than said core refractive index but higher than said primary cladding refractive index; said glass of said core and said glass of at least part of said primary cladding containing one or more photosensitizing dopants.

27 Claims, 4 Drawing Sheets

OPTICAL FIBRE AND OPTICAL FIBRE GRATING

BACKGROUND OF THE INVENTION

1. Field of the Invention

This invention relates to optical fibres and to optical fibre gratings.

2. Description of the Prior Art

Optical fibre gratings are periodic refractive index modulation written either in the cladding of an optical fibre (the low refractive index region to confine light) or the core of an optical fibre (the high refractive index region to guide light) or both. In order to write the grating, a suitable fibre usually has a photosensitive core, a photosensitive cladding or both. A glass is photosensitive when its refractive index can be modified (usually, for these purposes, permanently) by optical radiation.

In silica based optical fibres, a core can be made photosensitive simply by incorporating germanium, which also has the desired effect of raising the core refractive index to form a waveguide. A high germanium content is usually used to achieve a large photosensitivity. This, however, gives the fibre a large numerical aperture which can lead to a large splice loss when connected to a standard telecommunication optical fibre due to its incompatibility with standard telecommunication optical fibres.

Numerical aperture (NA) in an optical fibre is a measure of acceptance angle of light which can be guided along the core and is defined as:

$$NA = \sqrt{n_{co}^2 - n_{cl}^2} \quad (1)$$

where $n_{co}$ and $n_{cl}$ are the refractive index of the core and cladding respectively.

The silica based cladding is normally transparent to the writing beams, giving easy access to the core from the side of the fibre.

It has been found that adding boron into a germanium-doped silica region can obtain an enhanced photosensitivity [reference 1 listed below]. Since boron incorporation into silica will lower the refractive index of the glass, any desired refractive index can be achieved by incorporating appropriate amount of boron and germanium. A strongly photosensitive fibre can thus be made to be compatible with standard telecommunication optical fibre to achieve a reduced splice loss.

Another method to achieve a much improved photosensitivity is low temperature hydrogen loading technique where a pre-fabricated optical fibre is placed in a high pressure $H_2$ cell at room temperature for a few days to a few weeks to allow hydrogen to diffuse into the core region of the fibre [2]. A grating is written in the fibre before the hydrogen diffuses out. It is believed that photo-induced reaction of hydrogen with the glass components at bright part of the fringe pattern of the writing beam is behind the formation of gratings in this case. Refractive index change as high as 0.01 has been demonstrated with this technique enabling very strong gratings to be written in the core region of germanium-doped core of optical fibres.

In previous examples of writing optical fibre gratings, where only the core of an optical fibre is photosensitive, one imprinting technique involves exposing the side of the fibre to two coherent interfering optical beams [3]. The grating's pitch can be adjusted conveniently by changing the angle between the two beams. The writing beams in this case can be optical radiation at a wavelength between 160 nm (nanometers) to 300 nm. Using a photosensitive fibre core provides a large spatial overlap between the refractive index modulation and the guided optical transmission mode, since a large part of the optical power propagates in the core. Such an optical fibre is easily fabricated with current optical fibre manufacturing technologies.

Since the writing optical beam do not have to go through a thick photosensitive region which usually attenuates the writing beam strongly, a uniform exposure across the photosensitive core can be achieved. Such uniform exposure is very important to achieve gratings with certain desired characteristics, as will be mentioned later.

Another previously proposed method for writing fibre gratings is a technique using a phase mask [4]. A phase mask is a silica plate with many parallel periodic grooves written on it, and an image of the periodic pattern is produced in the space behind the phase mask when an optical radiation is directed onto the phase mask. A photosensitive fibre can be placed behind the phase mask for gratings to be imprinted in the photosensitive region of the optical fibre.

A significant feature of a uniform fibre grating is that it only reflects light at a certain resonant wavelength (Bragg wavelength) characteristic of the grating pitch, fibre parameters and the transverse field distribution of guided light. As a narrow band device, it has many applications such as reflectors for fibre lasers (particularly for single frequency fibre lasers), as band-stop filters, as band-pass filters, or in fibre sensors.

Another important application of optical fibre Bragg gratings is that they can be used to build add/drop filter for use in wavelength-division-multiplexing (WDM) systems [5]. In a WDM system, light at several different wavelengths propagates along the same optical fibre. An add/drop filter can take light at a particular wavelength out of the optical fibre or add light at a particular wavelength onto the optical fibre. Such a device is very important for a WDM system to operate.

A grating can also be made to be chirped, where different wavelengths are reflected at different point of along the grating by varying either the grating pitch or the fibre parameter or both along the grating. Such chirped grating has a strong dispersion because the reflected light at different wavelengths will have different path lengths. Such a grating can be used to compensate the dispersion in an optical fibre link and can also be used for optical pulse shaping [6].

In an optical waveguide, usually formed by a high refractive index region surrounded by a region with low refractive index, the total guided optical field can be divided into many basic elements with different transverse field distributions. Such basic elements are called modes of the waveguide [7]. Each mode is numbered by the order of the mode which gives the number of maximums in each dimension. The precise field distribution of each mode depends also on the waveguide parameters, such as core radius and NA of an optical fibre. Each mode is made not to be able to be further divided into other modes by introducing an orthogonality principle. In an optical fibre and a two dimensional polar co-ordinate, the orthogonality is expressed as $$NOI(\infty) = \int_0^{2\pi} \int_0^{\infty} \Psi_{mn}(r, \varphi)\Psi_{kl}(r, \varphi) r \, dr \, d\varphi = 0 \quad (2)$$

where NOI stands for normalised overlap integral; $\psi_{mn}(r,\phi)$ and $\psi_{kl}(r,\phi)$ are the normalised optical field distributions of $LP_{mn}$ mode and $LP_{kl}$ mode respectively.

In an optical fibre, the core size can be made small enough so that it can only support the lowest order $LP_{01}$ mode. Such fibre is called single mode optical fibre and optical fibre is thereafter referred to single mode optical fibre. It eliminates the problem that a temporal optical pulse is broadened due to that each mode take a different path and arrives at the other end of the optical fibre at a slightly different time as in a multimode optical fibre. An optical fibre is usually coated with a high refractive index polymer. If such polymer coating is stripped off as in the case when a fibre grating needs to be written in a part of the optical fibre, the glass part of the optical fibre forms a waveguide with the low refractive index air surrounding it. This is a large waveguide which can supports many modes, which are called cladding modes.

When a grating is written in such an optical fibre, the guided $LP_{01}$ mode do not only couple into the backward propagating guided $LP_{01}$ mode at the main Bragg wavelength but also into all the other cladding modes. Coupling into each mode will happen at a different wavelength and a series of notches will appear in the transmission spectrum at the short wavelength side of the main Bragg wavelength.

The resonant condition for the coupling to occur is $$\beta_{01}(\lambda) + \beta_{mn}(\lambda) = \frac{2\pi}{\Lambda} \quad (3)$$

where $\beta_{01}(\lambda)$ is the propagation constant of the $LP_{01}$ mode, $\beta_{mn}(\lambda)$ is the propagation constant of $LP_{mn}$ mode, and $\Lambda$ is the grating pitch. Where $\beta_{mn}(\lambda)$ is replaced by $\beta_{01}(\lambda)$, equation (3) gives the resonant condition for the main Bragg wavelength. The effective refractive index modulation of the grating for the coupling between the guided $LP_{01}$ and $LP_{mn}$ modes serves as a good measure for the coupling strength, $$\Delta n_{eff} = \int_0^{2\pi} \int_0^{\infty} \Delta n(r, \varphi) \Psi_{mn}(r, \varphi) \Psi_{kl}(r, \varphi) r dr d\varphi \quad (4)$$

where $\Delta n(r,\phi)$ is the refractive index modulation of the grating.

The cladding mode is eventually absorbed by the high refractive polymer coating when it propagates beyond the stripped part of the fibre. If another light propagates at the wavelengths of notches as it would do in a WDM system, the part of the light will be lost. Such loss can be severe if a strong grating is used. If a media with a refractive index equal to that of the cladding glass is placed around the coating-stripped part of the optical fibre, the discrete loss notches turn into a continuous broad band loss as this is equivalent to a waveguide with very large dimensions which would support a very large number of very closely spaced modes. In the extreme case where the dimensions of the waveguide becomes infinite, the discrete cladding modes turns to a broad continuous band. If a media with a higher refractive index than that of the cladding glass is placed around the coating-stripped part of the optical fibre, the cladding modes are no longer supported by the waveguides and become radiation modes.

One proposed method to counter this problem of loss at the short wavelength side of the main Bragg wavelength is based on suppression of the normalised refractive index change for the coupling of the guided $LP_{01}$ made into cladding modes by having a uniform photosensitive region across the cross section of the optical fibre [8]. From the orthogonality of the modes in equation (2), $NOI(\infty)$s between the $LP_{01}$ mode and the cladding modes are zero.

If a grating with a uniform refractive index change over the whole cross-section ($A\infty$) of an optical fibre is written, $\Delta n(r,\phi)$ in equation (4) will be constant over $A\infty$ and can therefore be taken out of the integration in equation (4). What is left in the integration will be $NOI(\infty)$ which is zero. In another words, the $LP_{01}$ mode will not couple into any of the cladding modes because the effective refractive index change for the coupling is zero. Since the $LP_{01}$ mode only has field distribution over the core and the part of the cladding immediately next to the core, it is usually sufficient to have only this part of the optical fibre photosensitive.

Although it is possible to introduce a photosensitive cladding around a photosensitive core in practice, it is, however, very difficult to make the same photosensitivity over both cladding and the core. Even if such a fibre can be made, writing a grating with a uniform refractive index change over the whole photosensitive area can be very difficult as the writing beam is strongly attenuated as it penetrates into the thick photosensitive region. Another proposed method is to use a high NA fibre [9].

The use of the high NA fibre increases the gap between the main grating wavelength and the next cladding mode coupling wavelength, so it leaves a useful operation band. However, such band is only about 7 nm wide in a high NA fibre (0.25) and thus is much less then what is desired in many applications.

It is an object of the invention to provide a photosensitive optical fibre which suppresses the coupling from the guided modes into cladding mode or radiation modes by an optical fibre grating.

SUMMARY OF THE INVENTION

The invention provides an optical fibre comprising:

a glass core having a core refractive index;

a glass primary cladding at least partially surrounding said core, said primary cladding having a primary cladding refractive index lower than said core refractive index;

a glass secondary cladding at least partially surrounding said primary cladding, said secondary cladding having a secondary cladding refractive index lower than said core refractive index but higher than said primary cladding refractive index;

said glass of said core and said glass of at least part of said primary cladding containing one or more photosensitizing dopants.

The invention also provides a fibre grating optically impressed onto photosensitive regions of such fibre.

In embodiments of this invention, an additional circular cladding layer with a lower refractive index than the normal cladding is added between the photosensitive core and the normal cladding (secondary cladding). Such an intermediate layer (primary cladding) can be very effective in increasing modal confinement in the core of the optical fibre and in reducing the cladding mode field strength over the core region of the optical fibre, thereby reducing the coupling strength between the guided mode to the cladding mode by an optical fibre grating.

Furthermore, when at least a part of this primary cladding adjacent to the core is made photosensitive (and this region can be as small as half the core size or smaller), the suppression of the coupling into cladding modes is much enhanced.

The effect is especially significant when the cladding is made more photosensitive than that of the core. By introducing a primary cladding with appropriate refractive index, photosensitivity and thickness, substantial suppression of the coupling from the guided mode to cladding modes can be achieved.

A preferred primary cladding has an refractive index more than 0.003 lower than the secondary cladding and has thickness from 0.5 μm to 40 μm with at least a small part of the cladding (half the core radius thick) adjacent to the core made photosensitive.

As a fibre depressed cladding supports LP11 core mode over a short length of fibre, coupling from the fundamental LP01 mode into the leaky LP11 mode is still possible, if the gratings is blazed (grating line is at a non-90 degree angle to the light propagation direction). It is therefore preferred that the grating structure has an internal blaze angle less than 0.2 degrees.

BRIEF DESCRIPTION OF THE DRAWINGS

The above and other objects, features and advantages of the invention will be apparent from the following detailed description of illustrative embodiments which is to be read in connection with the accompanying drawings, in which:

FIG. 1b is a schematic perspective illustration of the structure of a fibre having the refractive index profile of FIG. 1a;

[1] The internal blaze angle is the angle formed the light propagation direction and the line perpendicular to the grating lines.

DESCRIPTION OF THE PREFERRED EMBODIMENTS

Figure 1A:
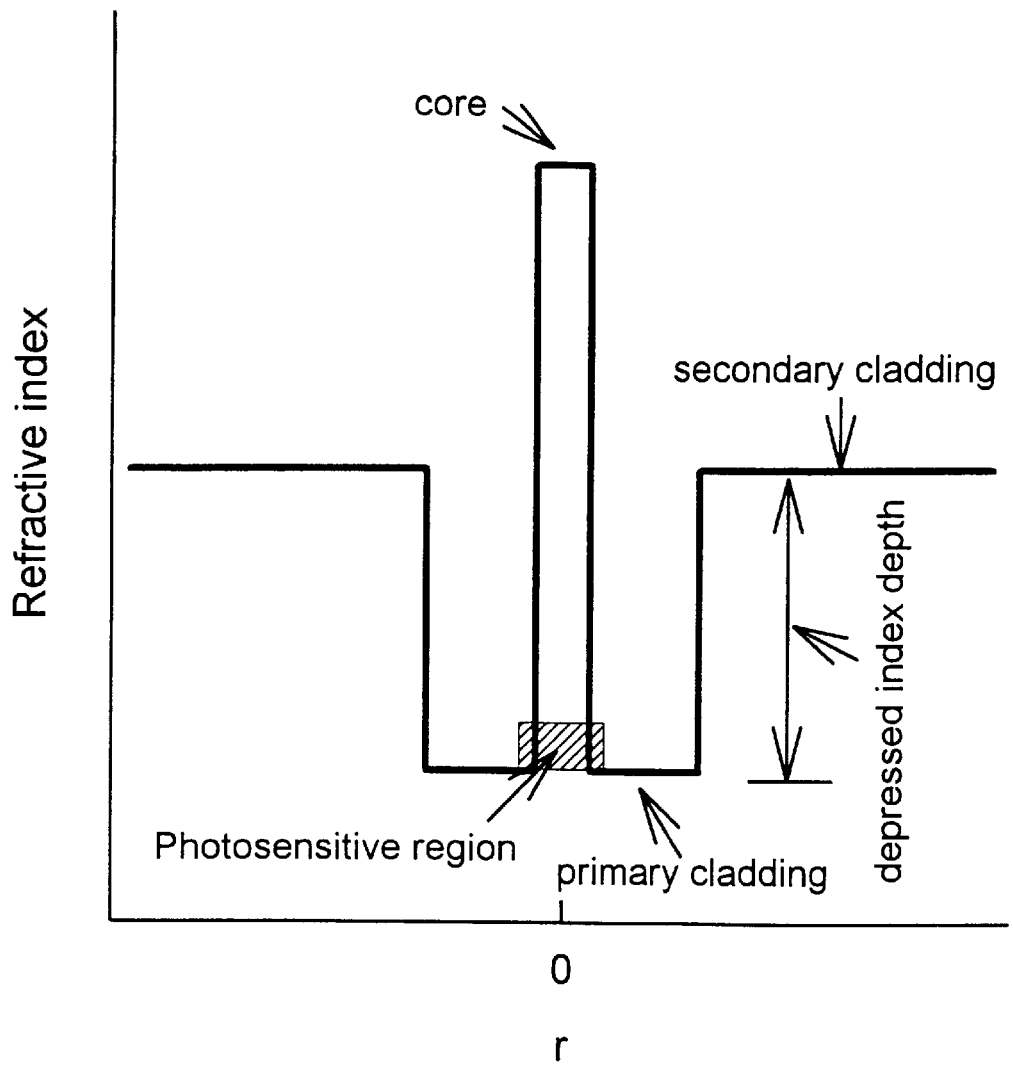
FIG. 1a schematically illustrates a proposed refractive index profile of an optical fibre for suppression of coupling from the guided modes to cladding modes.
Figure 1B:
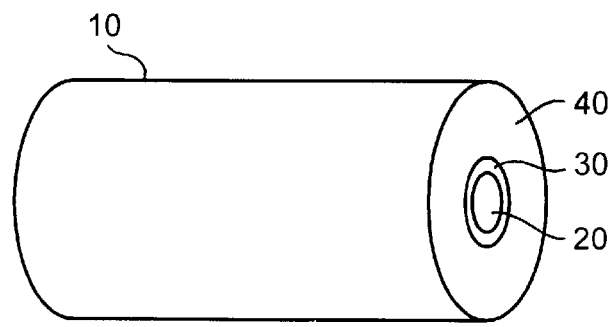

Referring now to FIG. 1a, there is shown schematically a proposed refractive index profile of an optical fibre for suppression of coupling from the guided modes to cladding modes. FIG. 1b is a schematic perspective illustration of the structure of a fibre having the refractive index profile of FIG. 1a.

In the fibre 10 of FIG. 1b, a glass core 20 is surrounded by a glass primary cladding layer 30, which in turn is surrounded by a glass secondary cladding layer 40. The relative refractive indices of the core and the two cladding layers are illustrated in FIG. 1a, from which it can be seen that the refractive index of the primary cladding layer is lower than that of the core and that of the secondary cladding layer. Accordingly, the primary cladding may be considered to have a "depressed" refractive index.

It will be understood that the demarcations between the different layers shown in FIG. 1b are purely for schematic illustration; if a real fibre was cross-sectioned and observed, then the boundaries between the different layers would generally not be observable without specialist instruments, and even then would not appear as dark lines. FIG. 1b is simply a schematic diagram (and not to scale) to assist the explanation of embodiments of the invention.

The core 20 and an inner part of the primary cladding 30 are photosensitive. As described below, a grating structure can be optically impressed onto these photosensitive regions using known grating impression techniques.

Most of the state of art technology for silica optical fibre manufacture is based on a known chemical vapour deposition process. With this technology, a depressed primary cladding can be easily introduced by doping silica with fluorine or boron. Boron doping was used in a prototype fibre to fabricate the photosensitive optical fibre to demonstrate the principle of this invention. The cladding photosensitivity was achieved in the prototype fibre by diffusion of Ge from the core during fabrication—in other words, it was not necessary to dope the glass used to form the primary cladding with germanium; sufficient germanium diffused from the core to provide a degree of photosensitivity.

Figure 2:
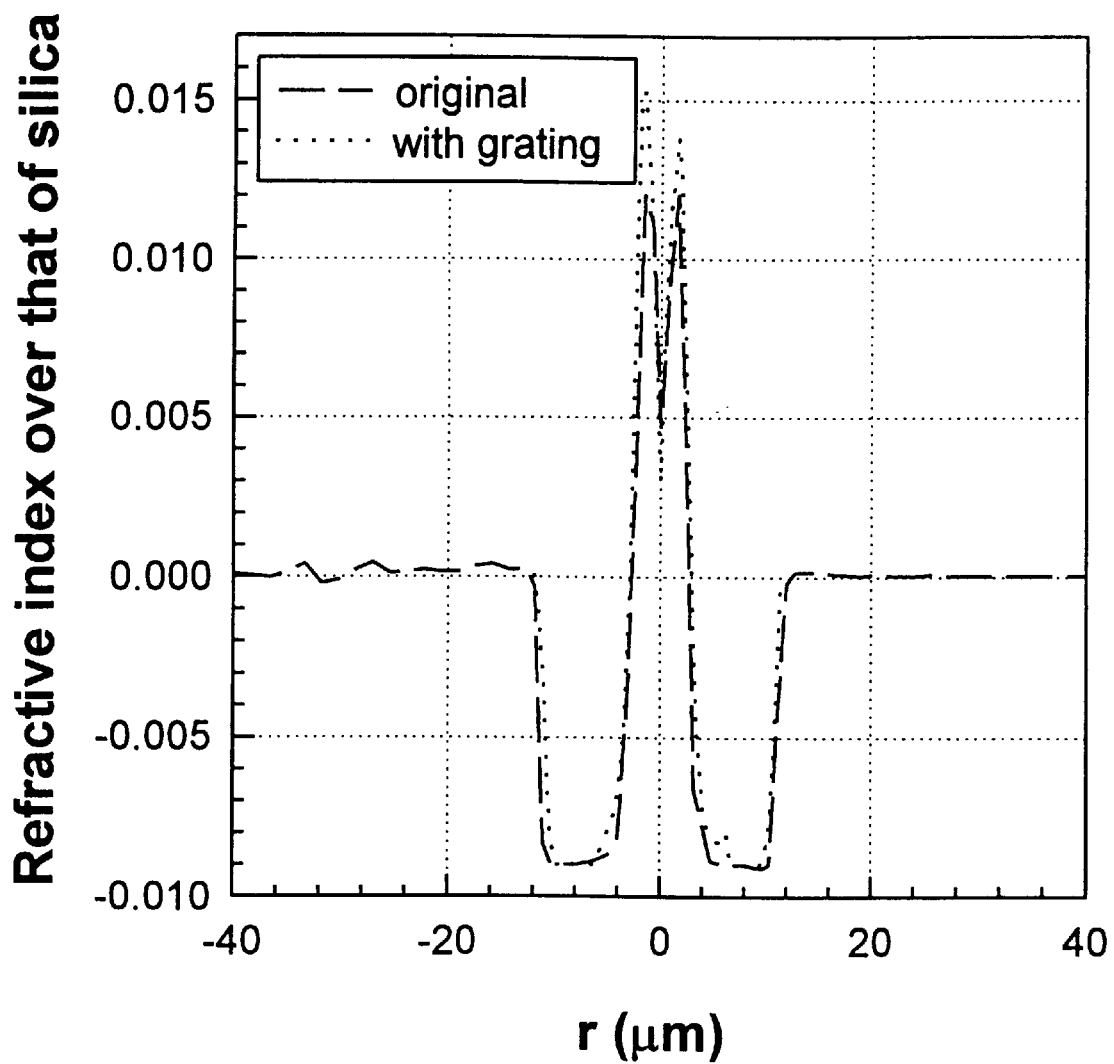
FIG. 2 schematically illustrates the refractive index profile of an optical fibre fabricated for the experimental demonstration of the principle and the refractive index profile of the same optical fibre with a photo-written grating therein.

An example of such a prototype fibre (in fact its measured refractive index profile) is shown in FIG. 2. The fibre has core with a refractive index of ~ (about) 0.01 higher than that of the silica and a radius of ~2.8 μm. The primary cladding has a thickness of ~13.4 μm and a refractive index ~0.01 lower than that of the silica. The area of the primary cladding adjacent to the core is made photosensitive by diffusion of Ge from the core during fabrication.

In more general terms, it is preferred that the primary cladding refractive index is at least 0.002 lower than the secondary cladding refractive index.

Similarly, it is preferred in embodiments of the invention, though not essential, that the primary cladding is between about 2 μm and about 25 μm thick.

Preferably in embodiments of the invention a region of the primary cladding at least 1 μm thick and adjacent to the core is photosensitive.

In some embodiments, the photosensitive region of the primary cladding has a higher photosensitivity than that of the core.

In some embodiments the region of the primary cladding is made photosensitive by diffusion of a photosensitizing dopant from the core during fabrication of the fibre.

Returning to the particular embodiment being described, the fibre has a core doped with ~7.5 mol % Ge, a primary cladding doped with ~10 mol % of B. The diffusion of Ge during fabrication made a ring of ~1 μm around the core photosensitive.

The boron doping has a primary purpose of lowering the refractive index of the primary cladding layer, but it has been postulated that there is some interaction between the boron in the primary cladding and the germanium in the core which may enhance the diffusion effect referred to above.

In general, the following dopants are preferred or at least possible:

(i) the core is formed of silica glass doped with one or more dopants selected from the list consisting of germanium, tin, cerium, boron, and nitrogen;

(ii) the primary cladding is formed of silica glass doped with boron and one or more dopants selected from the list consisting of germanium, tin, cerium and nitrogen;

(iii) the primary cladding is formed of silica glass doped with flourine and one or more dopants selected from the list consisting of germanium, tin, cerium and nitrogen;

(iv) the core is formed of germanium doped silica glass containing up to 30 mol % germanium;

(v) the core is formed of tin doped silica glass containing up to 30 mol % tin;

(vi) the core is formed of silica glass doped with boron and germanium and containing up to 40 mol % boron; and/or (vii) the core is formed of silica glass doped with boron and germanium and containing up to 15 mol % boron and up to 30 mol % germanium.

An example of an optical fibre with a photosensitive core and a small photosensitive primary cladding has been used to demonstrate the principles of the present embodiments, because, once the underlying principles of the invention have been identified, such photosensitive optical fibre is relatively easy to manufacture and it is relatively easy to introduce a uniform exposure to the writing beam across the thin photosensitive region, although an optical fibre with a photosensitive core and a larger photosensitive cladding would enhance the suppression of coupling into cladding modes or radiation modes.

FIG. 1a gives the refractive index profile of the proposed optical fibre for the suppression of the coupling from the guided modes into the cladding modes. This structure allows strongly confined modal power in the core, which makes it possible to achieve cladding mode suppression, especially when in combination of only a small part of the primary cladding adjacent to the core. The performance of a larger than 60 dB (decibel) peak transmission grating in this fibre is shown in FIG. 3b, where the cladding modes is suppressed to be less than 0.5 dB.

FIG. 2 shows the refractive index profile of the tested fibre before and after a grating is made. The fibre has core with a refractive index ~0.01 higher than that of the silica and a radius of ~2.8 µm. The primary cladding has a thickness of ~13.4 µm and a refractive index of ~0.01 lower than that of the silica. The area of the primary cladding adjacent to the core is made photosensitive by diffusion of Ge during fabrication.

Figure 3A:
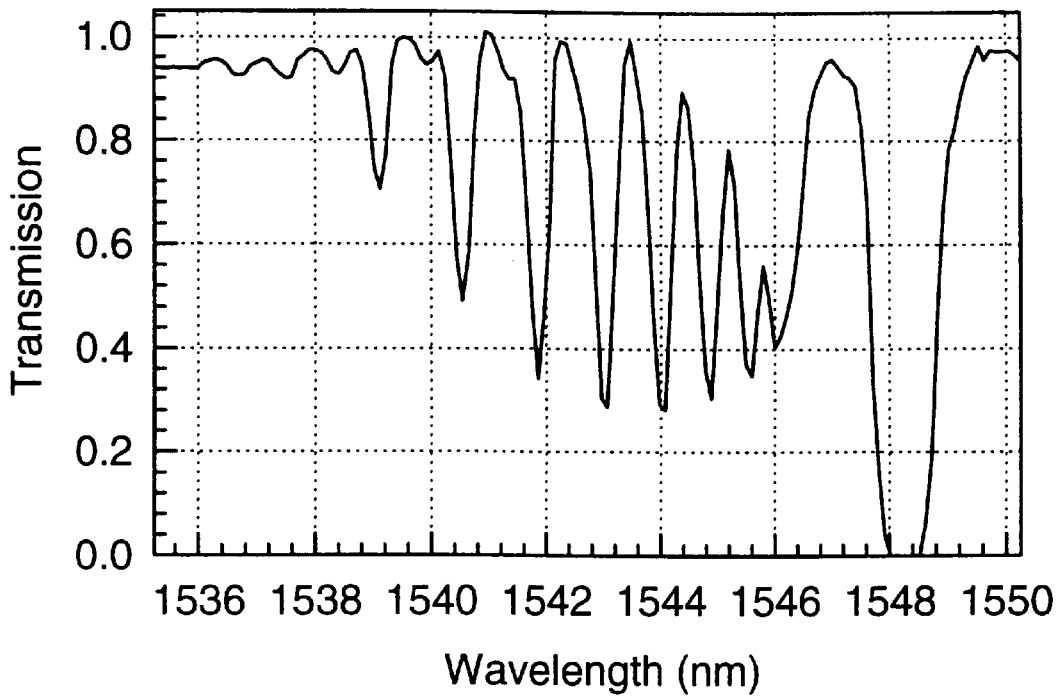
FIG. 3a schematically illustrates the transmission spectrum of a 15 mm long grating with a refractive index modulation of 0.001 in a conventional step index fibre with a photosensitive core with a NA of 0.15 and core radius of 3.98 μm.
Figure 3B:
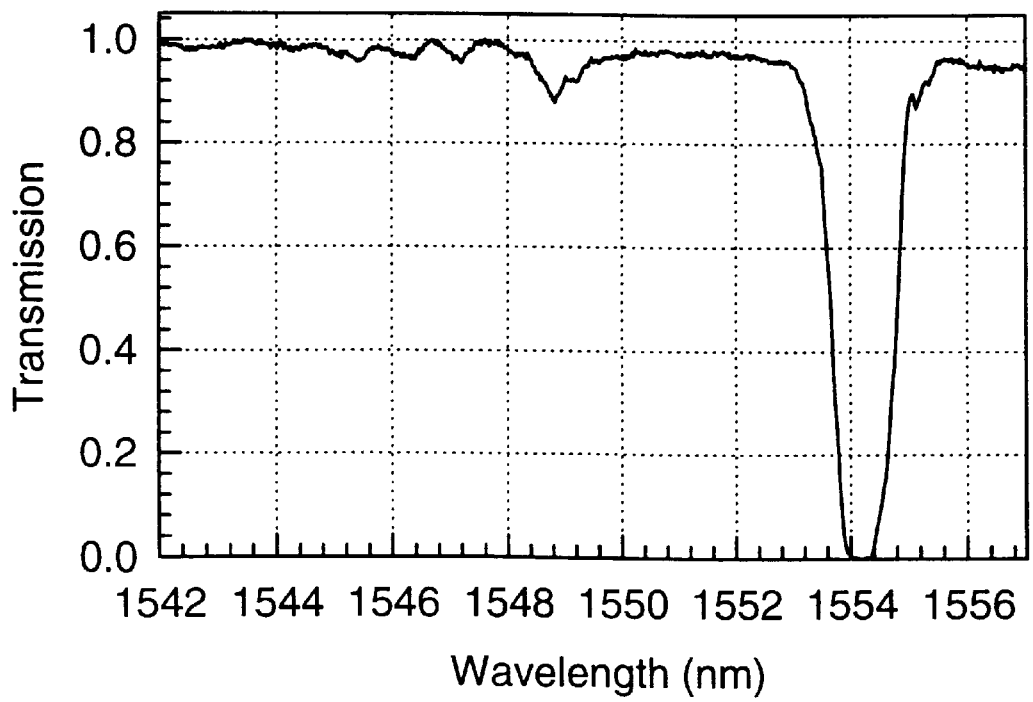
FIG. 3b schematically illustrates the transmission spectrum of a 15 mm long grating with a refractive index modulation of 0.001 in a fibre with a photosensitive core and a refractive index profile shown in FIG. 2.

FIGS. 3a and 3b show the transmission spectrum of a 15 mm long grating with a refractive index modulation of 0.001 in a step index fibre (FIG. 3a) with a photosensitive core with a NA of 0.15 and core radius of 3.98 µm, and in a fibre (FIG. 3b) with a photosensitive core and the refractive index profile shown in FIG. 2. The main Bragg band in this case has a transmission which is –60 dB lower than the out of band transmission. The strong suppression of the coupling of the guided $LP_{01}$ mode into cladding modes in the optical fibre with a depressed cladding can be seen in this figure. The small peaks in FIG. 9b) are due to coupling into the leaky $LP_{11}$ modes by a small blaze (less than 0.1 degree) in the grating. These peaks can be suppressed if the blaze is reduced.

Figure 4:
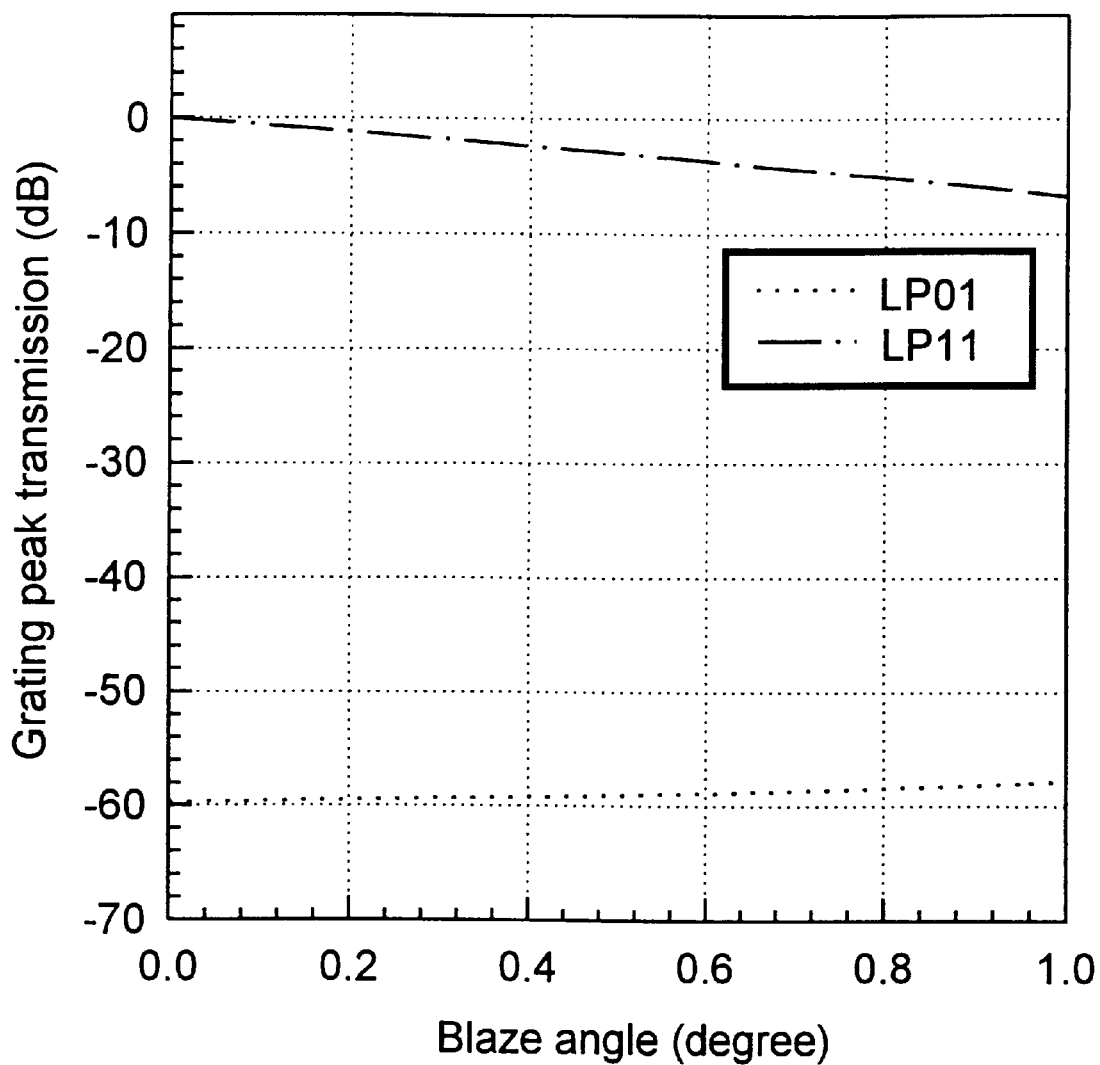
FIG. 4 schematically illustrates the dependence of the peak transmission loss of the main Bragg grating and the coupling from LP01 to leaky LP11 mode on the internal blaze angle[1].

FIG. 4 shows the dependence of the peak transmission loss of the main Bragg grating and the coupling from LP01 to leaky LP11 mode on the internal blaze angle. If a less than 0.5 dB is required for a –60 dB peak transmission grating, an internal blaze angle of less than 0.2 degrees (e.g. 0.1 degree) has to be achieved.

Although illustrative embodiments of the invention have been described in detail herein with reference to the accompanying drawings, it is to be understood that the invention is not limited to those precise embodiments, and that various changes and modifications can be effected therein by one skilled in the art without departing from the scope and spirit of the invention as defined by the appended claims.

PUBLICATION REFERENCES

1. WO 94/00784.
2. P. J. Lemaire, R. M. Atkins, V. Mizrahi and W. A. Reed: "High pressure H2 loading as a technique for achieving ultrahigh UV photosensitive and thermal sensitivity in $GeO_2$ doped optical fibres", Electronics Letters, 29, pp.1191–1193, 1993.
3. U.S. Pat. No. 4,725,110.
4. GB-A-2 272 075.
5. F. Bilodeau, D. C. Johnson, S. Th_riault, B. Malo, J. Albert and K. O. Hill: "An all-fibre dense-wavelength-division multiplexer/demultiplexer using photoimprinted Bragg Gratings", IEEE Photonics Technology Letters, 7, pp.388–390, 1995.
6. K. O. Hill, F. Bilodeau, B. Malo, T. Kitagawa. S. Th_riault, D. C. Johnson and J. Albert: "Chirped in-fibre Bragg gratings for compensation of optical-fibre dispersion", Optics Letters, 19, pp.1314–1316, 1994.
7. A. W. Snyder and W. R. Young: "Modes of optical waveguides", Journal of Optical Society of America, 68, pp.297–309, 1978.
8. E. Delevaque, S. Boj, J. F. Bayon, H. Poignat, J. Le Mellot, and M. Monerie: "Optical fibre design for strong gratings photoimprinting with radiation mode suppression", Optical Fibre Communications Conference, paper PD5, 1995.
9. T. Komukai and M. Nakazawa: "Efficient fibre gratings formed on high NA dispersion shifted fibres", European Conference on Optical Communications, paper MoA3.3, 1, pp.31–34, 1995.

We claim:

1. An optical fibre comprising:
    a core having a core refractive index;
    a primary cladding at least partially surrounding said core, said primary cladding having a primary cladding refractive index lower than said core refractive index;
    a secondary cladding at least partially surrounding said primary cladding, said secondary cladding having a secondary cladding refractive index lower than said core refractive index but higher than said primary cladding refractive index;
    the material of said core and the material of at least part of said primary cladding containing one or more photosensitizing dopants.

2. A fibre according to claim 1, in which the primary cladding refractive index is at least 0.002 lower than the secondary cladding refractive index.

3. A fibre according to claim 1, in which the primary cladding is between about 2 µm and about 25 µm thick.

4. A fibre according to claim 3, in which a region of the primary cladding at least 1 µm thick and adjacent to the core is photosensitive.

5. A fibre according to claim 4, in which the photosensitive region of the primary cladding has a higher photosensitivity than that of the core.

6. A fibre according to claim 4, in which the region of the primary cladding is made photosensitive by diffusion of a photosensitizing dopant from the core during fabrication of the fibre.

7. A fibre according to claim 6, in which the core is doped with germanium.

8. A fibre according to claim 7, in which the primary cladding is doped with boron.

9. A fibre according to claim 1, in which the core is formed of silica glass doped with one or more dopants selected from the list consisting of germanium, tin, cerium, boron, and nitrogen.

10. A fibre according to claim 1, in which the primary cladding is formed of silica glass doped with boron and one or more dopants selected from the list consisting of germanium, tin, cerium and nitrogen.

11. A fibre according to claim 1, in which the primary cladding is formed of silica glass doped with flourine and one or more dopants selected from the list consisting of germanium, tin, cerium and nitrogen.

12. A fibre according to claim 1, in which the core is formed of germanium doped silica glass containing up to 30 mol % germanium.

13. A fibre according to claim 1, in which the core is formed of tin doped silica glass containing up to 30 mol % tin.

14. A fibre according to claim 1, in which the core is formed of silica glass doped with boron and germanium and containing up to 40 mol % boron.

15. A fibre according to claim 1, in which the core is formed of silica glass doped with boron and germanium and containing up to 15 mol % boron and up to 30 mol % germanium.

16. A fibre according to claim 1, in which the core is doped with about 7.5 mol % of germanium.

17. A fibre according to claim 1, in which the primary cladding is doped with about 10 mol % of boron.

18. A fibre according to claim 1, the modal spot size of the fibre being equal or similar to that of a standard telecommunication fibre.

19. A fibre grating formed in a fibre according to claim 1, by optically impressing a grating structure onto photosensitive regions of the fibre.

20. A grating according to claim 19, in which the grating structure has an internal blaze angle less than 0.2 degrees.

21. An optical fibre comprising: a glass core having a core refractive index; a glass primary cladding at least partially surrounding said core, said primary cladding having a primary cladding refractive index lower than said core refractive index; a glass secondary cladding at least partially surrounding said primary cladding, said secondary cladding having a secondary cladding refractive index higher than said primary cladding refractive index; said glass of at least part of said core and said glass of at least part of said primary cladding being doped with one or more photosensitizing dopants.

22. A fibre according to claim 21, in which the primary cladding is formed of silica glass doped with a combination of boron and flourine and one or more dopants selected from the list consisting of germanium, tin, cerium and nitrogen.

23. A fibre according to claim 21, in which the core is silica doped with about 7.5 mol % of germanium.

24. A fibre according to claim 21, in which the primary cladding is silica doped with about 10 mol % of boron.

25. A fibre Bragg grating device formed in a single mode fibre according to claim 21, by optically impressing a periodic refractive index variation into the photosensitive regions of the fibre to form a reflection filter with reduced out of band loss.

26. A fibre according to claim 21, in which the primary cladding is between about 2 μm and about 25 μm thick.

27. A fibre according to claim 26, in which a region at least half a micrometer thick on both sides of the boundary between the core and primary cladding has a higher photosensitivity than that of the remainder of the core.

* * * * *